(12) United States Patent
Luo et al.

(10) Patent No.: US 12,317,356 B2
(45) Date of Patent: May 27, 2025

(54) LINK STATE NOTIFICATION METHOD AND DEVICE, LINK PROCESSING METHOD AND DEVICE, STORAGE MEDIUM AND ELECTRONIC DEVICE

(71) Applicant: ZTE CORPORATION, Guangdong (CN)

(72) Inventors: Wei Luo, Guangdong (CN); Lin Chen, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 372 days.

(21) Appl. No.: 17/599,114

(22) PCT Filed: Mar. 23, 2020

(86) PCT No.: PCT/CN2020/080553
§ 371 (c)(1),
(2) Date: Sep. 28, 2021

(87) PCT Pub. No.: WO2020/192603
PCT Pub. Date: Oct. 1, 2020

(65) Prior Publication Data
US 2022/0174772 A1 Jun. 2, 2022

(30) Foreign Application Priority Data
Mar. 28, 2019 (CN) .......................... 201910244417.5

(51) Int. Cl.
*H04W 76/19* (2018.01)
*H04W 36/36* (2009.01)

(52) U.S. Cl.
CPC .......... *H04W 76/19* (2018.02); *H04W 36/362* (2023.05)

(58) Field of Classification Search
CPC ..... H04W 76/19; H04W 76/18; H04W 76/15; H04W 76/27; H04W 24/04; H04W 36/305; H04W 36/36
See application file for complete search history.

(56) References Cited

U.S. PATENT DOCUMENTS

| 2011/0026437 | A1* | 2/2011 | Roja-Cessa | H04L 45/03 370/256 |
| 2020/0322813 | A1* | 10/2020 | Jia | H04W 24/10 |

(Continued)

FOREIGN PATENT DOCUMENTS

| CN | 107736004 A | 2/2018 |
| CN | 107852363 A | 3/2018 |

OTHER PUBLICATIONS

European Patent Office, Extended European Search Report dated Dec. 9, 2022, for corresponding EP application No. 20776636.1.

(Continued)

*Primary Examiner* — Rasheed Gidado
(74) *Attorney, Agent, or Firm* — Li & Cai Intellectual Property (USA) Office

(57) ABSTRACT

The present disclosure provides to a link state notification method, a link state notification device, a link processing method, a link processing device, a storage medium and an electronic device. The link state notification method includes: transmitting, by a first communication node, link state information to a second communication node which is a child node of the first communication node.

9 Claims, 2 Drawing Sheets

(56) References Cited

U.S. PATENT DOCUMENTS

| | | | | |
|---|---|---|---|---|
| 2021/0044344 | A1* | 2/2021 | Jiang | H04W 76/19 |
| 2021/0153281 | A1* | 5/2021 | Deogun | H04W 76/16 |
| 2021/0282050 | A1* | 9/2021 | Adjakple | H04L 1/1874 |
| 2021/0321315 | A1* | 10/2021 | Yi | H04W 36/249 |
| 2021/0377980 | A1* | 12/2021 | Fujishiro | H04W 40/22 |
| 2022/0007214 | A1* | 1/2022 | Zhang | H04W 36/00692 |
| 2022/0039188 | A1* | 2/2022 | Ishii | H04W 76/19 |

OTHER PUBLICATIONS

Nokia, et al., "Backhaul link RLF handling", 3GPP Draft, Feb. 14, 2019.
Lenovo, "RLF in backhaul link", 3GPP Draft, Nov. 12, 2018.
CATT, "Route Adaptation upon Backhaul Failure" , 3GPP Draft, Feb. 15, 2019.
Kyocera, "Consideration of topology adaptation upon BH RLF", 3GPP Draft, Feb. 15, 2019.
Qualcomm, "IAB backhaul RLF recovery for arch 1a", 3GPP TSG-RAN WG3 Meeting #102, Nov. 2, 2018.
ZTE, et al., "Procedures for backhaul link failure and recovery", 3GPP TSG RAN WG3 Meeting #102, Nov. 2, 2018.
Intellectual Property Office of Singapore, Written Opinion dated Jun. 19, 2023, for corresponding SG application No. 11202110770W.
Nokia, et al., "Backhaul link RLF handling", 3GPP TSG-RAN WG2 Meeting #105, R2-1900627, Feb. 14, 2019.
Lenovo, et al., " R2-1817170 Rlf in backhaul link ", 3GPP TSG-RAN WG2 Meeting #104, R2-1817170, dated Nov. 12, 2018.
CATT, "Route Adaptation upon Backhaul Failure", 3GPP TSG-RAN WG2 Meeting #105, R2-1900242, dated Feb. 15, 2019.
Kyocera, "Consideration of topology adaptation upon BH RLF", 3GPP TSG-RAN WG2 Meeting #105, R2-1900919, dated Feb. 15, 2019.
Qualcomm, et al., "IAB backhaul RLF recovery for architecture 1a", 3GPP TSG-RAN WG3 Meeting #102 R3-186455 Spokane, WA, USA, Nov. 12-16, 2018.
ZTE, et al., "Procedures for backhaul link failure and recovery", 3GPP TSG RAN WG3 Meeting #10 R3-186421 Spokane, USA, Nov. 12-16, 2018.
3rd Generation Partnership Project; Technical Specification Group Radio Access Network; NR; Study on Integrated Access and Backhaul; (Release 16) dated Dec. 2018.
WIPO, International Search Report issued on May 19, 2020.
ZTE, "Procedures for backhaul link failure and recovery", 3GPP TSG RAN WG3 Meeting #102 , dated Nov. 2, 2018.
Qualcomm , et al.,"IAB backhaul RLF recovery for architecture 1a", 3GPP TSG-RAN WG3 Meeting # 102, dated Nov. 2, 2018.

\* cited by examiner

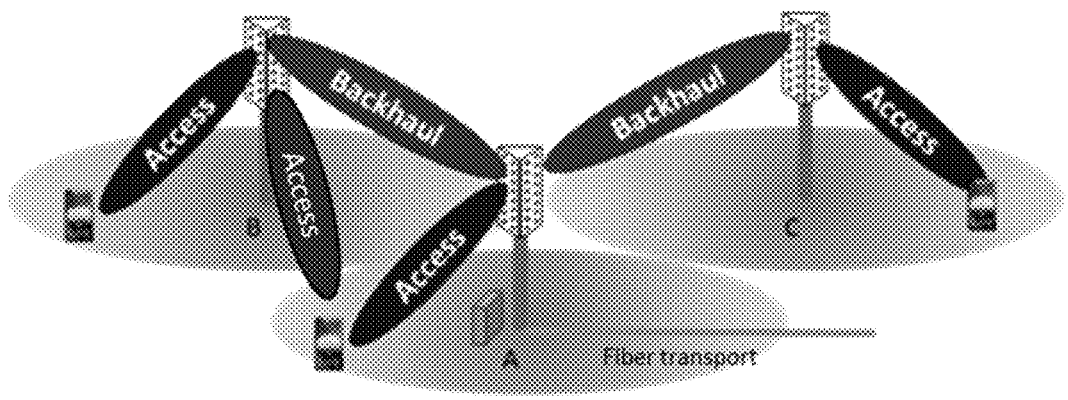
Fig. 1
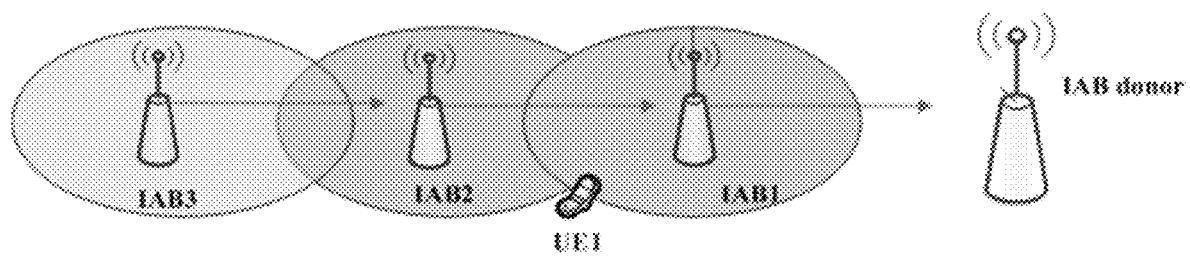
Fig. 2
| a first communication node transmits link state information to a second communication node which is a child node of the first communication node | ⌒ S302 |
Fig. 3

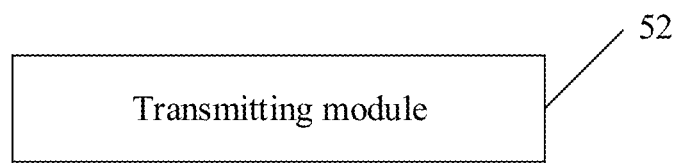
Fig. 4
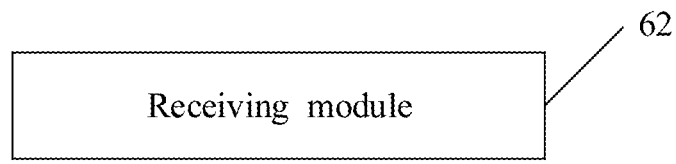
Fig. 5
Fig. 6

LINK STATE NOTIFICATION METHOD AND DEVICE, LINK PROCESSING METHOD AND DEVICE, STORAGE MEDIUM AND ELECTRONIC DEVICE

CROSS-REFERENCE TO RELATED APPLICATIONS

This is a National Phase Application filed under 35 U.S.C. 371 as a national stage of PCT/CN2020/080553, filed on Mar. 23, 2020, an application claiming the priority to the Chinese Patent Application No. 201910244417.5 filed with the CNIPA on Mar. 28, 2019, the entire contents of which are incorporated herein by reference.

TECHNICAL FIELD

The present disclosure relates to the field of communications, and in particular, to a link state notification method, a link state notification device, a link processing method, a link processing device, a storage medium and an electronic device.

BACKGROUND

In order to improve network capacity and coverage and meet flexibility requirement of cell deployment at the same time, a relay link supporting wireless backhaul is proposed for realizing deployment of a dense network in the related art. A node supporting a relay function is called a Relay Node (RN). The RN provides functions and services similar to those provided by an evolved NodeB (eNB) for a User Equipment (UE) connected to a cell of the RN, a wireless interface between the RN and the UE is referred to as an "Access Link". The RN is connected to a base station (eNB), which provides services for the RN, through a wireless interface in a way similar to that of a normal UE, the eNB which provides services for the RN is referred to as a Donor eNB (DeNB), and the wireless interface between the RN and the DeNB is referred to as a "Backhaul Link".

Future communication technology supports larger bandwidths and larger-scale multi-antenna or multi-beam transmission, which facilitates implementation of a relay in which a backhaul link and an access link share air interface resources, resulting in so-called Integrated Access Backhaul (IAB). In order to improve deployment flexibility, an ordinary IAB node does not need to be directly connected to a core network, and only an IAB donor is directly connected to the core network, so that all the ordinary IAB nodes need to transmit data to the IAB donor for communicating with the core network. FIG. 1 is a schematic diagram of an IAB link in the related art. As shown in FIG. 1, IAB node A is connected to a core network through an optical fiber and serves as an IAB donor, and IAB node B and IAB node C are not connected to the core network and serve as ordinary IAB nodes.

In order to improve deployment flexibility, FIG. 2 is a schematic diagram of a link where IAB nodes serve as RNs in the related art. As shown in FIG. 2, an IAB node may transmit data to an IAB donor by using multiple IAB nodes as RNs, that is, the IAB nodes are divided into levels, and a level of an IAB node represents the number of IAB hops for the IAB node to transmit data to the IAB donor. Assuming that a level of an IAB donor is level 0 and a level of an IAB node to which a UE is connected is level N, a transmission path between the UE and a core network sequentially covers an IAB node at level 1, an IAB node at level 2 . . . an IAB node at level N. Assuming that a connection establishment procedure between IAB nodes is similar to that between a UE and a base station, an IAB node at level n+1 may be regarded as a UE for an IAB node at level n. Conversely, the IAB node at the level n may be regarded as a service cell for the IAB node at the level n+1. If the IAB node at the level n+1 is connected to the IAB node at the level n through a Uu interface like a UE, the IAB node at the level n is referred to as a parent node of the IAB node at the level n+1, and the IAB node at the level n+1 is referred to as a child node of the IAB node at the level n. Each IAB node may choose to be connected to one or more parent nodes.

In a case where an IAB node is used as an RN, if the RN stops providing services for a child node thereof immediately when link communication between the RN and a service node thereof is interrupted due to poor link state or congestion, the child node may need to be connected to another communication node through Radio Resource Control (RRC) reestablishment, and may need to be re-connected to the RN through handover after the link of the RN is recovered, which causes instability of a network topology and requires high control signaling overhead. However, if the RN continuously provides services for the child node, a large communication interrupt delay is incurred at the child node in a case where a link recovery fails or a new communication node cannot be accessed through the reestablishment.

SUMMARY

Embodiments of the present disclosure provide a link state notification method, a link state notification device, a link processing method, a link processing device, a storage medium and an electronic device, so as to at least solve the problems of the instability of a network topology, the high control signaling overhead and the large communication interrupt delay caused when the link communication between the RN and the service node thereof is interrupted due to poor link state or congestion in the related art.

According to an embodiment of the present disclosure, there is provided a link state notification method, including: transmitting, by a first communication node, link state information to a second communication node which is a child node of the first communication node.

Optionally, the link state information includes at least one of: a Radio Link Failure (RLF) indication, an RRC reconfiguration failure indication, an RRC integrity check failure indication, a mobility failure indication, a synchronous reconfiguration failure indication, and a timer timeout indication.

Optionally, the first communication node transmits the link state information to the second communication node under one of the following conditions: the first communication node enters an RRC idle state; the first communication node starts an RRC connection reestablishment procedure; and the first communication node detects a timer timeout.

Optionally, the link state information includes one of: an indication that the first communication node enters an idle state; an indication of initiation of RRC connection reestablishment; and a timer timeout indication.

Optionally, the link state information further includes: link state recovery indication information.

Optionally, the method further includes: transmitting, by the first communication node, the link state information and node identification information of the first node to the second communication node.

Optionally, the node identification information may be a level identification of the first communication node, which is configured to indicate the number of hops from the first communication node to an IAB donor.

Optionally, after the step of transmitting the link state information, the method further includes: performing, by the first communication node, link recovery; and updating, by the first communication node, a user access control parameter in system information or stopping transmitting a system information block.

Optionally, the first communication node transmits the link state information and state identification information of the first communication node to the second communication node, and the state identification information is configured to indicate link recovery time and/or a node state of the first communication node.

According to another embodiment of the present disclosure, there is provided a link processing method, including: receiving, by a second communication node, link state information of a first communication node, where the second communication node which is a child node of the first communication node.

Optionally, the link state information includes at least one of: an RLF indication, an RRC reconfiguration failure indication, an RRC integrity check failure indication, a mobility failure indication, a synchronous reconfiguration failure indication, and a timer timeout indication.

Optionally, the link state information includes one of: an indication that the first communication node enters an idle state, an indication of initiation of RRC connection reestablishment, and a timer timeout indication.

Optionally, after the step of receiving, by the second communication node, the link state information of the first communication node, the method further includes: setting, by the second communication node, time-out time T for a timer and starting the timer.

Optionally, after the step of starting the timer, the method further includes: stopping, by the second communication node, the timer when the second communication node receives link state recovery indication information transmitted by the first communication node.

Optionally, after the step of starting the timer, the method further includes: determining, by the second communication node, that a link failure occurs when the timer is timed out.

Optionally, the second communication node starts a cell group failure procedure to report a Secondary Cell Group (SCG) link failure.

Optionally, when a cause for deciding to transmit cell group failure information is a timer timeout, the second communication node sets a failure type in the cell group failure information as the timer timeout. Optionally, the cell group failure information includes Master Cell Group (MCG) failure information and SCG failure information.

Optionally, when the time counted by the timer exceeds T, the second communication node initiates connection reestablishment, or initiates conditional handover.

Optionally, T is included in one of: a system message, an RRC reconfiguration message and a cell group configuration message.

Optionally, after the step of receiving, by the second communication node, the link state information of the first communication node, the method further includes: transmitting, by the second communication node, a link state information acknowledgement message to the first communication node.

Optionally, the method further includes: receiving, by the second communication node, the link state information and node identification information of the first communication node; and transmitting, by the second communication node, the link state information and the node identification information of the first communication node to a third communication node, which includes a child node of the second communication node.

Optionally, the node identification information of the first communication node includes: a level identification of the first communication node, which is configured to indicate the number of hops from the first communication node to an IAB donor; or the node identification information of the first communication node includes: the number of hops from the second communication node to the first communication node.

Optionally, the node identification information of the first communication node includes: a level identification of the first communication node, which is configured to indicate the number of hops from the first communication node to an IAB donor. Optionally, the node identification information of the first communication node includes: the number of hops from the second communication node to the first communication node.

Optionally, after the second communication node receives the link state information and the node identification information of the first communication node, the second communication node starts a cell group failure procedure to report a cell group link failure.

Optionally, the second communication node sets a failure type in the cell group failure information as a link failure of service node.

Optionally, the node identification information of the first communication node is carried in the cell group failure information.

Optionally, after receiving the link state information, the second communication node performs measurement on a non-service cell.

Optionally, the first communication node includes one of: a terminal, a relay, an IAB node, a Distributed Unit (DU) portion of an IAB node and a base station; and the second communication node includes one of: a relay, an IAB node, and a Mobile-Termination (MT) portion of an IAB node.

According to another embodiment of the present disclosure, there is provided a link state notification device located at a first communication node, including: a transmitting module configured to transmit link state information to a second communication node which is a child node of the first communication node.

According to another embodiment of the present disclosure, there is provided a link processing device located at a second communication node, including: a receiving module configured to receive link state information of a first communication node, where the second communication node is a child node of the first communication node.

According to yet another embodiment of the present disclosure, there is further provided a storage medium having a computer program stored therein, and the computer program is configured to perform any one of the above methods when being executed.

According to still another embodiment of the present disclosure, there is further provided an electronic device, including a memory having a computer program stored therein, and a processor configured to execute the computer program to perform any one of the above methods.

According to the present disclosure, the child node is timely notified of the link state information related to the link failure after the link failure occurs at the parent node, so that the child node can process the connection to the parent node on time. Thus, the present disclosure can solve the problems of the instability of a network topology, the high control signaling overhead and the large communication interrupt delay caused when the link communication between the RN and the service node thereof is interrupted due to poor link state or congestion in the related art, and can achieve effects of reducing the control signaling overhead and eliminating the communication interrupt delay.

BRIEF DESCRIPTION OF THE DRAWINGS

FIG. 1 is a schematic diagram of an IAB link in the related art;

FIG. 2 is a schematic diagram of a link where IAB nodes serve as RNs in the related art;

FIG. 3 is a flowchart illustrating a link state notification method according to an embodiment of the present disclosure;

FIG. 4 is a flowchart illustrating a link processing method according to an embodiment of the present disclosure;

FIG. 5 is a block diagram of a link state notification device according to an embodiment of the present disclosure; and FIG. 6 is a block diagram of a link processing device according to an embodiment of the present disclosure.

DETAILED DESCRIPTION

The present disclosure will be described in detail below with reference to the accompanying drawings in conjunction with embodiments.

The terms "first", "second" and the like herein are used for distinguishing between similar objects, but not necessarily for describing a particular order or a chronological order.

For facilitating a better understanding of the solutions in the following embodiments, the terms used herein are described and explained below. However, the description and explanation are given as general explanation, and any reasonable derivation or reasonable variation based on the idea of the following embodiments is also included in the protection scope of the present disclosure.

IAB donor: a next generation NodeB (gNB) which provides network access for a terminal through a backhaul and access link network.

IAB node: a node of Radio Access Network (RAN) which supports a New Radio (NR) access link of a terminal and NR backhaul links of a parent node and a child node.

Uplink direction: a direction from an IAB node and an IAB donor to an IAB donor in a directed acyclic topology.

Downlink direction: a direction from an IAB node and an IAB donor to a leaf node in a directed acyclic topology.

Parent node: an uplink node of an IAB node or a northbound node of the IAB node. The parent node includes an IAB node or a DU of an IAB donor (IAB-donor-DU).

Child node: a downlink node of an IAB node or a southbound node of the IAB node. The child node includes an IAB node.

Southbound: a direction away from an IAB donor in a multi-hop backhaul link.

Northbound: a direction towards an IAB donor in a multi-hop backhaul link.

All IAB nodes connected to an IAB donor by one or more hops and the IAB donor form a directed acyclic topology, and the IAB donor is a root node. In the topology, a parent node or an uplink node of an IAB node may also be defined as a neighbor node close to the root node, and a child node of the IAB node may also be defined as a neighbor node close to a leaf node.

Embodiment One

This embodiment provides a link state notification method. FIG. 3 is a flowchart illustrating a link state notification method according to an embodiment of the present disclosure. As shown in FIG. 3, the method includes step S302.

At step S302, a first communication node transmits link state information to a second communication node which is a child node of the first communication node.

Optionally, the first communication node includes one of: a terminal, a relay, an IAB node, a DU portion of an IAB node and a base station; and the second communication node includes one of:

a relay, an IAB node, and an MT portion of an IAB node.

The network topology applied in this embodiment may be applied to the structures shown in FIG. 1 and FIG. 2. FIGS. 1 and 2 are given merely for exemplary illustration, and any network topology having same or similar functions is included in the protection scope of this embodiment and will not be described in detail here.

Optionally, the link state information includes at least one of: an RLF indication, an RRC reconfiguration failure indication, an RRC integrity check failure indication, a mobility failure indication, a synchronous reconfiguration failure indication, and a timer timeout indication.

Optionally, the first communication node transmits the link state information to the second communication node under one of the following conditions: the first communication node enters an RRC idle state; the first communication node starts an RRC connection reestablishment procedure; and the first communication node detects a timer timeout.

Since an RLF is a continuous process, it is necessary to make preparations for early notification to a child node at the beginning of Out of Synchronization (OOS). Therefore, the first communication node needs to be provided with two timers, so that the first communication node may determine that an RLF occurs after detecting the first OOS, thereby overcoming the problem of an overlong interrupt delay. The two timers include: a T310 timer used for detection of an occurrence of an RLF when the timer is timed out; and a T3XXX timer used for transmission of radio link state information to a child node when the timer is timed out. Although the same type of timers may be used, the functions of the timers in this embodiment are different from those of the timers described in Embodiment Two.

Optionally, the link state information further includes one of: an indication that the first communication node enters an idle state; an indication of initiation of RRC connection reestablishment; and a timer timeout indication.

Optionally, the link state information further includes link state recovery indication information.

When the link state information is received, if the IAB node is indicated in dual connectivity, it is very possible that the IAB node may recover the route quickly, so that the child node does not need to reselect a new parent node; but for a child node in dual connectivity, the child node may preferably select the other route to forward data of a terminal in a short period. If the IAB node is indicated in single connectivity but is configured with Controlled Hand off (CHO), the child node does not need to reselect a new parent node. For a child node in dual connectivity, the child node may preferably select the other route to forward data of a terminal in a short period; but considering the possibility of a handoff failure, the child node may make preparations for access to a new parent node, for example, the child node may select a target parent node and detect a synchronization signal. If the IAB node is indicated in single connectivity and not configured with CHO, and needs to be perform RRC connection reestablishment, a child node in dual connectivity may suspend transmission of a current link temporarily and carry out transmission through the other link, and a child node in single connectivity may start to perform CHO.

The first communication node may try to perform link recovery after detecting a link problem, and transmit link recovery indication information to the second communication node if the link recovery is successful.

Considering that the second communication node may need to forward the indication information to a child node thereof after receiving the indication information, it is necessary to indicate an identification of a DU where the RLF occurs. For saving the overhead, the identification of the DU may be a simplified identification, e.g., a level identification of the DU.

It is not enough to simply indicate that the RLF has occurred, since the first communication nodes of different types need different time for recovery, for example, the first communication node in dual connectivity and the first communication node configured with CHO recover faster than the first communication which is in single connectivity and not configured with CHO, or in other word, a network-assisted link recovery takes shorter time than a link recovery performed by the first communication node itself through the RRC reestablishment. Thus, a level of estimated link recovery time may be transmitted to the second communication node based on the different types of the link recoveries.

Since whether the newly connected first communication node is still connected to an original donor Centralized Unit (donor CU) has an influence on the lower second communication node after the link is reestablished, an indication as to whether the donor CU may be changed may be transmitted or identification information of the donor CU may be directly transmitted, so as to help the second communication node make preparations in advance.

Optionally, the method further includes: transmitting, by the first communication node, the link state information and node identification information of the first node to the second communication node.

Optionally, the node identification information may be a level identification of the first communication node, which is configured to indicate the number of hops from the first communication node to an IAB donor.

Optionally, after the step of transmitting the link state information, the method further includes: performing, by the first communication node, link recovery, and updating, by the first communication node, a user access control parameter in system information or stopping transmitting a system information block.

Optionally, if the parent node is configured with conditional handover to target cell, the parent node may perform conditional handover upon the occurrence of the RLF. Alternatively, if the parent node is in multi-connectivity, the parent node may perform link recovery through an SCG when the RLF occurs in an MCG, or perform link recovery through the MCG when the RLF occurs in the SCG. Thus, in those scenarios where the parent node may recover quickly, the child node may not be notified of the RLF. The child node is notified of the RLF only when the parent node cannot recover quickly. When the parent node cannot recover quickly, the parent node may transmit the link state information to the child node while initiating the connection reestablishment.

Optionally, the first communication node transmits the link state information and state identification information of the first communication node to the second communication node, and the state identification information is configured to indicate link recovery time and/or a node state of the first communication node.

In order to help the child node make a reasonable judgment, the child node needs to be notified of a current state when the RLF occurs, for example, the time required for link recovery is classified into multiple levels or multiple cases, a level/case of the link recovery time of the first communication node is level/case 1 when the first communication node is in dual connectivity, a level/case of the link recovery time of the first communication node is level/case 2 when the first communication node is configured with conditional handover, and a level/case of the link recovery time of the first communication node is level/case 3 when the first communication node is in single connectivity and performs link recovery only through the RRC connection reestablishment; and an indication of predication of whether a target donor CU in a recovered link is changed may also be notified. The state identification information includes at least one of a link recovery identification and a node state identification. The link recovery identification is configured to determine a level of the time required by the first communication node to perform link recovery. The node state identification is configured to determine the node state of the first communication node, and the node state includes one of multi-connectivity, single-connectivity, and conditional handover to target cell.

It can be known from the above description of the implementations that the method provided in this embodiment may be implemented by software together with a necessary general-purpose hardware platform, and may also be implemented by hardware. Based on such understanding, the technical solutions of the present disclosure may be implemented in the form of a software product, which is stored in a storage medium (such as a Read Only Memory (ROM)/Random Access Memory (RAM), a magnetic disk and an optical disc) and includes several instructions configured to enable a terminal device (which may be a mobile phone, a computer, a server or a network device) to perform the methods according to the embodiments of the present disclosure.

Embodiment Two

This embodiment provides a link processing method. FIG. 4 is a flowchart illustrating a link processing method according to an embodiment of the present disclosure. As shown in FIG. 4, the method includes step S402.

At step S402, link state information of a first communication node is received by a second communication node which is a child node of the first communication node.

Optionally, the first communication node includes one of: a terminal, a relay, an IAB node, a DU portion of an IAB node and a base station; and the second communication node includes one of: a relay, an IAB node, and an MT portion of an IAB node.

Optionally, the link state information includes at least one of: an RLF indication, an RRC reconfiguration failure indication, an RRC integrity check failure indication, a mobility failure indication, a synchronous reconfiguration failure indication, and a timer timeout indication.

Optionally, the link state information further includes one of: an indication that the first communication node enters an idle state; an indication of initiation of RRC connection reestablishment; and a timer timeout indication.

Optionally, after the step of receiving the link state information of the first communication node by the second communication node, the method includes: setting time-out time T for a timer and starting the timer by the second communication node.

Optionally, after the step of starting the timer, the method further includes: stopping the timer by the second communication node when the second communication node receives link state recovery indication information transmitted by the first communication node.

Optionally, after the step of starting the timer, the method further includes: determining, by the second communication node, that a link failure occurs when the timer is timed out.

A start condition of the timer includes: RLF indication information is received. A stop condition of the timer includes at least one of: a link recovery indication is received; connection reestablishment is started; and an RRC reconfiguration message is received.

After the timer is timed out, a connection reestablishment procedure is started, or a cell group failure information report procedure is started.

The timer may be a Txxx timer, that is, a conventional timer such as a T310 timer. Alternatively, the timer may be a newly defined dedicated timer disposed at the second communication node, which is not described in detail here.

Optionally, when the time-out time of the timer is out, the second communication node initiates connection reestablishment, or initiates conditional handover.

When the time-out time T of the timer is set, the second communication node also needs to select a new parent node for subsequent processes. The second communication node cannot wait for the resolution of the failure of the first communication node endlessly. Therefore, if the link failure of the first communication node is resolved before the time-out time T is out, the second communication node does not need to carry out link connection to the new parent node, and only needs to maintain the connection to the original first communication node. If the time-out time T is out, the second communication node takes the selected new parent node as a new first communication node to connect. The step of initiating the connection reestablishment includes, but is not limited to, detecting and searching for a new cell, selecting a target cell, performing downlink synchronization, or starting an RRC connection reestablishment procedure.

The second communication node starts a cell group failure procedure to report an SCG link failure.

When a cause for deciding to transmit cell group failure information is a timer timeout, the second communication node sets a failure type in the cell group failure information as the timer timeout. The cell group failure information includes MCG failure information and SCG failure information.

Optionally, T is set in a system message, an RRC reconfiguration message or a cell group configuration message.

Optionally, after the step of receiving the link state information of the first communication node by the second communication node, the method further includes: transmitting, by the second communication node, a link state information acknowledgement message to the first communication node.

The link state information acknowledgement message is carried by a Medium Access Control-Control Element (MAC CE) or carried by control information of adaptation layer.

Optionally, the method further includes: receiving, by the second communication node, the link state information and node identification information of the first communication node; and transmitting, by the second communication node, the link state information and the node identification information of the first communication node to a third communication node, which includes a child node of the second communication node.

Optionally, the node identification information of the first communication node includes: a level identification of the first communication node, which is configured to indicate the number of hops from the first communication node to an IAB donor; or the node identification information of the first communication node includes: the number of hops from the second communication node to the first communication node.

Optionally, the node identification information of the first communication node includes: a level identification of the first communication node, which is configured to indicate the number of hops from the first communication node to an IAB donor. Optionally, the node identification information of the first communication node includes: the number of hops from the second communication node to the first communication node.

Optionally, after the second communication node receives the link state information and the node identification information of the first communication node, the second communication node starts a cell group failure procedure to report a cell group link failure.

Optionally, the second communication node sets a failure type in the cell group failure information as a link failure of service node.

Optionally, the node identification information of the first communication node is carried in the cell group failure information.

Optionally, assuming that a following topological relationship exists, that is, IAB donor-IAB node 1-IAB node 2-IAB node 3-IAB node 4-UE, after the IAB node 2 starts an RRC connection reestablishment procedure, Mode 1: the IAB node2 transmits link state information and level information 2 to the IAB node3, and the IAB node3 forwards the received information to the IAB node 4; Mode 2: the IAB node2 transmits the link state information and identification information 0 to the IAB node3, and the IAB node3 transmits the received link state information and identification information 1 to the IAB node 4. The identification information 0 may not be sent by default, the identification information 0 represents that a node having a link problem is the node that transmits the information, and the identification information 1 represents that a node having a link problem is a previous-hop node of the node that transmits the information, and so on.

Optionally, after receiving the link state information, the second communication node performs measurement on a non-service cell.

The second communication node receives the link state information and state identification information of the first communication node; according to the state identification information and a node state of the first communication node, the second communication node determines whether link recovery time of the first communication node exceeds preset recovery time; if it is determined that the link recovery time of the first communication node does not exceed the preset recovery time, the second communication node performs uplink flow control; otherwise, the second communication node initiates connection reestablishment or initiates conditional handover. The state identification information has been described in detail in the Embodiment One, and thus is not repeated here.

After receiving the link state information and the state identification information, the second communication node may determine that a link failure occurs at the first communication node (the parent node) and may also determine the time required for link recovery. If the link recovery time is short, the second communication node may perform uplink flow control. If the link recovery time is long, the second communication node may make preparations for connection reestablishment, including detecting and searching for a new cell, selecting a target cell, performing downlink synchronization, or starting an RRC connection reestablishment procedure.

When the child node is notified that the IAB node needs to perform RRC reestablishment, the child node forwards the link state information to a child node thereof. In addition, the IAB node may perform uplink flow control. For a child node in dual connectivity, the child node may suspend transmission on a current link, perform transmission through the other link, and report a state of the failed link to a donor CU through an SCG or an MCG. For a child node in single connectivity, after receiving a reestablishment instruction from the IAB node, the child node may start to make preparations for CHO or RRC reestablishment or directly perform CHO and a RRC reestablishment procedure, maintain the connection to the parent node, and perform RRC reestablishment. If the child node is successfully connected to a new parent node before receiving link state recovery indication information, the child node is kept in dual connectivity before receiving the link state recovery indication information. If the child node receives the link state recovery indication information later, the child node is disconnected from the new parent node; but if the time is out, the child node is disconnected from the original parent node. An MT portion performs RRC reestablishment under the condition of keeping the existing connection, the donor CU makes a decision after receiving a reestablishment request. If the original parent node does not recover the connection, the MT portion may allow the child node to be connected to the new parent node and send an RRC reestablishment message, then the child node releases the connection to the original parent node and updates the DU of the original parent node. If the original parent node recovers the connection, the MT portion rejects the RRC reestablishment request.

If the IAB node enters the RRC idle state, the IAB node releases a current link. For a child node in dual connectivity, the child node may report a link state to the donor CU through the MCG or the SCG, and perform a handover procedure or an SCG change procedure; and for a child node in single connectivity, the child node may perform a CHO procedure or an RRC reestablishment procedure.

If the $N^{th}$ OOS is detected, that is, if an indication is transmitted in advance when an RLF is possible to occur but has not been confirmed, the operation of the child node is similar to that in a case of receiving the link state information.

When the timer is timed out, the child node releases a current link. For a child node in dual connectivity, the child node may report a link state to the donor CU through the MCG or the SCG, and perform a handover procedure or an SCG change procedure; and for a child node in single connectivity, the child node may perform a CHO procedure or an RRC reestablishment procedure.

In order to facilitate a better understanding of the technical solutions described in the above embodiments, the following scenarios are further provided for illustration and description.

Scenario One

After a link failure occurs at an IAB node/relay, the IAB node/relay may shortly recover link connection by itself.

At step 1, an IAB node/relay detects a link problem between the IAB node/relay and a parent node thereof.

At step 2, the IAB node/relay transmits link state information to a child node. The link state information includes at least one of: an RLF indication, an RRC reconfiguration failure indication, an RRC integrity check failure indication, a mobility failure indication, and a synchronous reconfiguration failure indication.

At step 3, after receiving the link state information, the child node sets time-out time T for a Txxx timer and starts the Txxx timer. Furthermore, the child node selects a new parent IAB node/relay, without releasing the connection to the current IAB node/relay.

At step 4, after receiving the link state information, the child node transmits RLF acknowledgement information to the IAB node/relay.

At step 5, the IAB node/relay tries to perform link recovery and succeeds.

At step 6, the IAB node/relay transmits link recovery information to the child node.

At step 7, after receiving the link recovery information, the child node stops the Txxx timer and maintains the connection to the current IAB node/relay.

Scenario Two

After a link failure occurs at an IAB node/relay, the IAB node/relay may not shortly recover link connection by itself.

At step 1, an IAB node/relay detects a link problem between the IAB node/relay and a parent node thereof.

At step 2, the IAB node/relay transmits link state information to a child node. The link state information includes at least one of: an RLF indication, an RRC reconfiguration failure indication, an RRC integrity check failure indication, a mobility failure indication, and a synchronous reconfiguration failure indication.

At step 3, after receiving the link state information, the child node sets time-out time for a Txxx timer and starts the Txxx timer. Furthermore, the child node selects a new parent IAB node/relay, without releasing the connection to the current IAB node/relay.

At step 4, after receiving the link state information, the child node transmits RLF acknowledgement information to the IAB node/relay.

At step 5, when the Txxx timer is timed out, the child node determines that an RLF occurs and releases the connection to the current IAB node/relay.

At step 6, a terminal starts a connection reestablishment procedure to be connected to the new parent IAB node/relay selected in the step 3, so as to perform wireless link communication.

Scenario Three

A link failure occurs at an IAB node/relay, and the IAB node/relay provides time for autonomously recovering link connection.

At step 1, an IAB node/relay detects a link problem between the IAB node/relay and a parent node thereof.

At step 2, the IAB node/relay transmits link state information and state identification information to a child node. The state identification information includes a link recovery identification or a node state identification. The link recovery identification is configured to reflect a level of the time required by the IAB node/relay to perform link recovery, and the node state identification is configured to reflect a current state of the IAB node/relay.

At step 3, after receiving the link state information and the state identification information, the child node knows the occurrence of the RLF at the parent node and the estimated time required for the recovery.

At step 4, the child node determines whether the link recovery time exceeds preset recovery time. If not, step 5 is performed; otherwise, step 6 is performed.

At the step 5, if the link recovery time does not exceed the preset recovery time, the child node performs uplink flow control.

At the step 6, if the link recovery time exceeds the preset recovery time, the child node makes preparations for connection reestablishment, including: detecting and searching for a new cell, selecting a target cell, performing downlink synchronization, or starting an RRC connection reestablishment procedure.

Scenario Four

A link failure occurs at an IAB node, and the IAB node performs a fast recovery procedure.

At step 1, an IAB node detects a link problem between the IAB node and a parent node thereof, and determines whether a quick recovery procedure may be started, if yes, step 2 is performed; otherwise, step 3 is performed.

At step 2, the IAB node starts the quick recovery procedure, which includes: initiating conditional handover in a case where the IAB node is configured with conditional handover to target cell; and in a case where the IAB node is in multi-connectivity, performing link recovery through an SCG if the RLF occurs in an MCG, or performing link recovery through the MCG if the RLF occurs in the SCG.

At step 3, the IAB node starts a connection reestablishment procedure and transmits link state information to a child node. The link state information includes at least one of: an RLF indication, an RRC reconfiguration failure indication, an RRC integrity check failure indication, a mobility failure indication, and a synchronous reconfiguration failure indication.

At step 4, after receiving the link state information, the child node sets time-out time for a Txxx timer and starts the Txxx timer. Furthermore, the child node selects a new parent IAB node, without releasing the connection to the current IAB node.

At step 5, after receiving the link state information, the child node transmits RLF acknowledgement information to the IAB node.

At step 6, if the IAB node tries to performs link recovery and succeeds, the steps stated in the Scenario One are subsequently performed.

At step 7, if the Txxx timer is timed out, the steps stated in the Scenario Two are subsequently performed.

Scenario Five

At step 1, an IAB node/relay detects a link problem between the IAB node/relay and a parent node thereof.

At step 2, the IAB node/relay transmits link state information and node identification information of the IAB node/relay to a child node.

At step 3, the child node forwards the received link state information and the received node identification information of the IAB node/relay to a child node of the child node.

The step "the child node selects a new parent IAB node/relay" which exists or may exist in the above scenarios or derivative scenarios is not limited to being performed in the order described in the above scenarios. That is, the child node may select the new parent node after determining that the timer is timed out or the link recover time exceeds the preset recovery time, or the child node may select the new parent node while starting the timer. For example, the child node may select the new parent node at a moment just before the timer is timed out. Therefore, any moment when the child node selects the new parent node, which is derived from the idea of the present disclosure, is included in the protection scope of the above embodiments, and is not described in detail here.

Embodiment Three

This embodiment provides a link state notification device, which is configured to implement the above embodiments and implementations, and what has been illustrated above is not repeated here. The term "module" used below may be a combination of software and/or hardware that can perform predetermined functions. Although the device described in the embodiment below is implemented by software, the implementation by hardware or a combination of software and hardware is possible and can be conceived.

FIG. 5 is a block diagram of a link state notification device according to an embodiment of the present disclosure. The link state notification device is located at a first communication node, and, as shown in FIG. 5, includes a transmitting module 52.

The transmitting module 52 is configured to transmit link state information to a second communication node which is a child node of the first communication node.

Each of the above modules may be implemented by software or hardware. If by hardware, all the modules may be located in a same processor; or the modules may be randomly combined and located in different processors. However, the implementation of the modules by hardware is not limited thereto.

Embodiment Four

This embodiment provides a link processing device, which is configured to implement the above embodiments and implementations, and what has been illustrated above is not repeated here. The term "module" used below may be a combination of software and/or hardware that can perform predetermined functions. Although the device described in the embodiment below is implemented by software, the implementation by hardware or a combination of software and hardware is possible and can be conceived.

FIG. 6 is a block diagram of a link processing device according to an embodiment of the present disclosure. The link processing device is located at a second communication node, and, as shown in FIG. 6, includes a receiving module 62.

The receiving module 62 is configured to receive link state information of a first communication node.

The second communication node is a child node of the first communication node.

Each of the above modules may be implemented by software or hardware. If by hardware, all the modules may be located in a same processor; or the modules may be randomly combined and located in different processors. However, the implementation of the modules by hardware is not limited thereto.

Embodiment Five

An embodiment of the present disclosure further provides a storage medium having a computer program stored therein, and the computer program is configured to perform any one of the above methods when being executed.

Optionally, in the embodiment, the storage medium may be configured to store a computer program configured to perform the following steps: transmitting link state information by a first communication node to a second communication node which is a child node of the first communication node; or receiving link state information of a first communication node by a second communication node which is a child node of the first communication node.

Optionally, in the embodiment, the storage medium may include, but is not limited to, a Universal Serial Bus flash disk (USB flash disk), a Read-Only Memory (ROM), a Random Access Memory (RAM), a mobile hard disk, a magnetic disk, an optical disc, and any other medium capable of storing a computer program.

An embodiment of the present disclosure further provides an electronic device, including a memory having a computer program stored therein, and a processor configured to execute the computer program to perform any one of the above methods.

Optionally, the electronic device may further include a transmission device and an input/output device, both of which are connected to the processor.

Optionally, in the embodiment, the processor may be configured to perform the following steps through the computer program: transmitting link state information by a first communication node to a second communication node which is a child node of the first communication node; or receiving link state information of a first communication node by a second communication node which is a child node of the first communication node.

Optionally, reference can be made to the examples described in the above embodiments and optional implementations for specific examples of this embodiment. Thus, those specific examples are not described in detail here.

All of the above modules or steps in the present disclosure may be implemented by general purpose computing devices, and may be collectively arranged in a single computing device or be distributed in a network composed of a plurality of computing devices. Optionally, the modules or steps may be implemented by program codes executable by a computing device, so that the modules or steps can be stored in a memory and executed by the computing device; and the steps illustrated or described may be performed in an order different from that described herein in some cases; or each of the modules and steps may be formed into an individual integrated circuit module; or a plurality of the modules or steps may be implemented by being formed into a single integrated circuit module. Thus, the present disclosure is not limited to any specific combination of hardware and software.

What is claimed is:

1. A link processing method, comprising:
receiving, by a second communication node, link state information of a first communication node;
wherein the second communication node is a child node of the first communication node, and the link state information comprises at least one of:
a Radio Link Failure (RLF) indication;
a Radio Resource Control (RRC) reconfiguration failure indication;
an RRC integrity check failure indication;
a mobility failure indication;
a synchronous reconfiguration failure indication; and
a timer timeout indication,
starting, by the second communication node, a cell group failure procedure to report a cell group link failure; and
setting, by the second communication node, a failure type in cell group failure information as a link failure of service node,
wherein the second communication node comprises one of: a relay, an Integrated Access Backhaul (IAB) node, and a Mobile-Termination (MT) portion of an IAB node.

2. The method of claim 1, wherein the link state information comprises one of:
an indication that the first communication node enters an idle state;
an indication of initiation of RRC connection reestablishment; and
a timer timeout indication.

3. The method of claim 1, after the step of receiving, by the second communication node, the link state information of the first communication node, further comprising:
setting, by the second communication node, time-out time T for a timer and starting the timer.

4. The method of claim 1, further comprising:
receiving, by the second communication node, node identification information of the first communication node.

5. The method of claim 4, further comprising:
transmitting, by the second communication node, the link state information and the node identification information of the first communication node to a third communication node,
wherein the third communication node comprises a child node of the second communication node.

6. The method of claim 3, after the step of starting the timer, further comprising:
initiating, by the second communication node, connection reestablishment or conditional handover when the time-out time of the timer is out.

7. The method of claim 3, after the step of starting the timer, further comprising:
stopping, by the second communication node, the timer in response to the second communication node receiving link state recovery indication information transmitted by the first communication node; and
determining, by the second communication node, that an RLF occurs in response to the timer being timed out.

8. A non-transitory storage medium having a computer program stored therein, wherein the computer program is configured to, when being executed, perform the link processing method of claim 1.

9. An electronic device, comprising a memory having a computer program stored therein, and a processor configured to execute the computer program to perform the link processing method of claim 1.

* * * * *